(12) United States Patent
Vilekar et al.

(10) Patent No.: US 11,760,629 B1
(45) Date of Patent: Sep. 19, 2023

(54) REFINERY GAS PROCESSING METHOD

(71) Applicant: Precision Combustion, Inc., North Haven, CT (US)

(72) Inventors: Saurabh Vilekar, Woodbridge, CT (US); Eric Allocco, Cheshire, CT (US); Subir Roychoudhury, Madison, CT (US)

(73) Assignee: PRECISION COMBUSTION, INC., North Haven, CT (US)

( * ) Notice: Subject to any disclaimer, the term of this patent is extended or adjusted under 35 U.S.C. 154(b) by 37 days.

(21) Appl. No.: 17/336,612

(22) Filed: Jun. 2, 2021

Related U.S. Application Data

(60) Provisional application No. 63/035,183, filed on Jun. 5, 2020.

(51) Int. Cl.
*C01B 3/38* (2006.01)
*B01J 8/00* (2006.01)

(52) U.S. Cl.
CPC .............. *C01B 3/382* (2013.01); *B01J 8/008* (2013.01); *B01J 2208/00539* (2013.01);
(Continued)

(58) Field of Classification Search
CPC ............ C01B 3/382; C01B 2203/0233; C01B 2203/0455; C01B 2203/1017;
(Continued)

(56) References Cited

U.S. PATENT DOCUMENTS 3,246,951 A * 4/1966 Ramella ............... C10G 49/007
423/248
5,051,241 A 9/1991 Pfefferle
(Continued)

FOREIGN PATENT DOCUMENTS

| WO | WO2004060546 A2 | 7/2004 |
| WO | WO2012087343 A1 | 6/2012 |
| WO | WO2012141766 A1 | 10/2012 |

OTHER PUBLICATIONS

Co-Pending unpublished non-provisional patent application, U.S. Appl. No. 16/182,681, filed Nov. 7, 2018, entitled "Bimetallic Catalyst for Catalytic Partial Oxidation of Hydrocarbons," Applicant: Precision Combustion, Inc.

*Primary Examiner* — Jafar F Parsa
(74) *Attorney, Agent, or Firm* — Andrew D. Gathy

(57) ABSTRACT

A process for hydrogen recovery from refinery gas system comprising supplying the refinery gas to an inlet manifold fluidly coupled to a conditioning stage, the conditioning stage comprising a reactor having a reforming catalyst deposited on an ultra-short-channel-length metal substrate; supplying oxidant to the conditioning stage via the inlet manifold; supplying steam from a steam generator to the conditioning stage via the inlet , manifold; reacting the refinery gas in the conditioning stage; and discharging a product through a discharge outlet fluidly coupled to the conditioning stage, the discharge outlet configured to flow the product for use by a downstream reformer. The process allows to either increase the H2 production rate or lower the firing rate while maintaining a constant H2 production rate for the downstream steam reformer, independent of the feed compositional variability of the refinery or still gas.

18 Claims, 3 Drawing Sheets

(52) U.S. Cl.
CPC ............... *B01J 2208/00548* (2013.01); *C01B 2203/0233* (2013.01); *C01B 2203/0455* (2013.01); *C01B 2203/0485* (2013.01); *C01B 2203/063* (2013.01); *C01B 2203/1017* (2013.01); *C01B 2203/1064* (2013.01); *C01B 2203/1235* (2013.01); *C01B 2203/1258* (2013.01)

(58) Field of Classification Search
CPC ...... C01B 2203/1064; C01B 2203/1258; B01J 8/008; B01J 2208/00548; B01J 2208/00539
See application file for complete search history.

(56) References Cited

U.S. PATENT DOCUMENTS

| | | |
|---|---|---|
| 6,156,444 A | 12/2000 | Smith |
| 7,037,485 B1 | 5/2006 | Drnevich |
| 7,504,047 B2 | 3/2009 | Castaldi |
| 7,976,594 B2 | 7/2011 | Roychoudhury |
| 8,444,951 B2 | 5/2013 | Roychoudhury |
| 8,557,189 B2 | 10/2013 | Roychoudhury |
| 8,795,398 B2 | 8/2014 | Roychoudhury |
| 9,199,846 B2 | 12/2015 | Roychoudhury |
| 9,337,505 B2 | 5/2016 | Roychoudhury |
| 2008/0044347 A1 | 2/2008 | Roychoudhury |

* cited by examiner

REFINERY GAS PROCESSING METHOD

CROSS-REFERENCE TO RELATED APPLICATIONS

This application claims benefit of U.S. provisional patent application No. 63/035,183 filed Jun. 5, 2020

GOVERNMENT RIGHTS

This invention was made with support from the U.S. government under Contract No. DE-SC0015880 sponsored by the Department of Energy. The U.S. government holds certain rights in this invention.

BACKGROUND

The present disclosure is directed to the improved process of hydrogen recovery from refinery/still gas, and more particularly use of a short-contact time substrate with a supported catalyst, preferably a catalyst bed comprising a reforming catalyst deposited on an ultra-short-channel-length substrate.

Hydrogen recovery from refinery/still gas has the potential to meet the increasing on-site refinery demand for hydrogen. Refinery still gas is a mixture of streams generated in various refinery operations such as hydrocracking, catalytic reforming, catalytic cracking and the like. Direct reformation of still gas in conventional steam reformers is only applicable for sulfur-free, low olefin streams.

However, a majority of the still gas available does not meet this criterion and includes sulfur and olefin. Traditionally, still gas is first hydrotreated.

This results in olefin hydrogenation and conversion of organic sulfur (e.g., mercaptans) to H2S. H2S is removed by desulfurization using ZnO pellets. The desulfurized hydrocarbon stream is mixed with steam and fed to a steam reformer, followed by H2 recovery in a Pressure Swing Adsorption (PSA) unit. Traditional hydrotreating catalysts (nickel molybdenum or cobalt molybdenum) must be properly sulfided to be fully active. These catalysts suffer from deactivation due to i) occasional lower feed sulfur content, causing catalyst reduction due to loss of sulfur from catalyst surface and b) exothermicity associated with olefin hydrogenation reactions, limiting maximum acceptable olefin concentration to ~5 vol.% (due to the narrow operating temperature window of up to 400° C.) in the feed refinery or still gas. To minimize catalyst deactivation, recycle loop of processed gas with cooler and/or natural gas dilution of feed still gas are required, severely limiting the single-pass processing capability of still gas. An upstream pre-reformer may also be needed if significant amount of heavy hydrocarbons such as pentanes are to be processed. This lowers the heat duty on the steam reformer and minimizes the steam requirement. Thus, traditional hydrotreaters are limited in their processing capability of refinery/still gas due to the wide range of composition in the gas.

Optimization of the steam reformer hydrotreater efficiency is severely hampered by the still gas compositional variability over time, demanding continuous, online and reliable monitoring of feed composition to maximize the steam reformer efficiency based on known composition and feed carbon number. However, such online measurements add complexity and cost to the process.

What is needed is a method and system that is configured to process refinery/still gas independent of the compositional variability to maintain a controlled feed to the downstream steam reformer as well as relatively constant operating conditions within the fired steam reformer. The upstream refinery/still gas processor would reduce the high concentration of olefins (in presence of sulfur) to less than 1 vol % which can be readily processed in the downstream steam reformer without increasing the heat duty or causing deactivation or coking of traditional Ni based steam reforming catalyst.

SUMMARY

In accordance with the present disclosure, there is provided a refinery gas system for hydrogen recovery comprising a conditioning stage fluidly coupled to an inlet manifold, the conditioning stage comprising a reactor having a reforming catalyst deposited on an ultra-short-channel-length substrate; an oxidant stream fluidly coupled to the conditioning stage via the inlet manifold upstream of the conditioning stage; a steam generator fluidly coupled to the conditioning stage via the inlet manifold upstream of the conditioning stage; at least one process gas supply fluidly coupled upstream of the conditioning stage via the inlet manifold; and a discharge outlet fluidly coupled to the conditioning stage, the discharge outlet configured to flow a product for gas phase desulfurization and subsequently for use by a downstream reformer.

A further embodiment of any of the foregoing embodiments may additionally and/or alternatively include the reforming catalyst comprising an Rh-based catalyst.

A further embodiment of any of the foregoing embodiments may additionally and/or alternatively include the conditioning stage configured for the refinery gas processing at space velocities as high as 175,000 $hr^{-1}$.

A further embodiment of any of the foregoing embodiments may additionally and/or alternatively include the conditioning stage configured for processing refinery gas comprising up to about 19 volume percent olefins, in an oxidative mode in the absence of a dilution or a recycle.

A further embodiment of any of the foregoing embodiments may additionally and/or alternatively include the feed gas comprising a still gas composition.

A further embodiment of any of the foregoing embodiments may additionally and/or alternatively include the reforming catalyst deposited on ultra-short-channel-length metal substrate configured to operate up to 1000 degrees Centigrade.

A further embodiment of any of the foregoing embodiments may additionally and/or alternatively include non-sulfided reforming catalyst deposited on the ultra-short-channel-length metal substrate.

A further embodiment of any of the foregoing embodiments may additionally and/or alternatively include the reforming catalyst deposited on the ultra-short-channel-length metal substrate that is configured to perform a complete conversion of an organic sulfur species present in the refinery gas.

In accordance with the present disclosure, there is provided a process for hydrogen recovery from refinery gas system comprising supplying the refinery gas to an inlet manifold fluidly coupled to a conditioning stage, the conditioning stage comprising a reactor having a reforming catalyst deposited on an ultra-short-channel-length metal substrate; supplying oxidant to the conditioning stage via the inlet manifold; supplying steam from a steam generator to the conditioning stage via the inlet manifold; reacting the refinery gas in the conditioning stage; and discharging a product through a discharge outlet fluidly coupled to the conditioning stage, the discharge outlet configured to flow the product to a downstream gas phase desulfurizer followed by for use by a downstream reformer.

A further embodiment of any of the foregoing embodiments may additionally and/or alternatively include the process further comprising processing at space velocities as high as 175,000 hr$^{-1}$ through the conditioning stage.

A further embodiment of any of the foregoing embodiments may additionally and/or alternatively include the process further comprising processing of feed gas comprising up to about 19 volume percent olefins in an oxidative mode in the absence of a dilution or a recycle through the conditioning stage.

A further embodiment of any of the foregoing embodiments may additionally and/or alternatively include the process further comprises performing a complete conversion of an organic sulfur present in the refinery gas feed on the reforming catalyst deposited on the ultra-short-channel-length metal substrate.

A further embodiment of any of the foregoing embodiments may additionally and/or alternatively include the process further comprises reacting the refinery gas in the conditioning stage up to 1000 degrees Centigrade.

A further embodiment of any of the foregoing embodiments may additionally and/or alternatively include the process further comprises performing selective reduction of olefins in the refinery gas to less than 1.0 volume percent in the product.

A further embodiment of any of the foregoing embodiments may additionally and/or alternatively include the reforming catalyst comprises an Rh-based catalyst.

A further embodiment of any of the foregoing embodiments may additionally and/or alternatively include supplying oxidant to the conditioning stage via the inlet manifold includes an O/C ratio of 0.25-0.75. The quantity of oxidant relative to quantity of refinery/still gas fed to the conditioning stage is best described by an O/C ratio, wherein "O" represents the moles of oxygen present in the oxidant and "C" represents the moles of carbon present in the refinery/still gas fed to the conditioning stage.

A further embodiment of any of the foregoing embodiments may additionally and/or alternatively include supplying steam from a steam generator to the conditioning stage via the inlet manifold includes a steam-to-carbon ($H_2O/C$) ratio of 0.5-1.0. $H_2O/C$ ratio is defined as molar ratio of steam to moles of carbon in the refinery/still gas feed stream.

A further embodiment of any of the foregoing embodiments may additionally and/or alternatively include the process further comprises operating at pressure compatible with the downstream steam reformer of up to 300 psia.

Other details of the refinery gas process are set forth in the following detailed description and the accompanying drawings wherein like reference numerals depict like elements.

DETAILED DESCRIPTION

Figure 1:
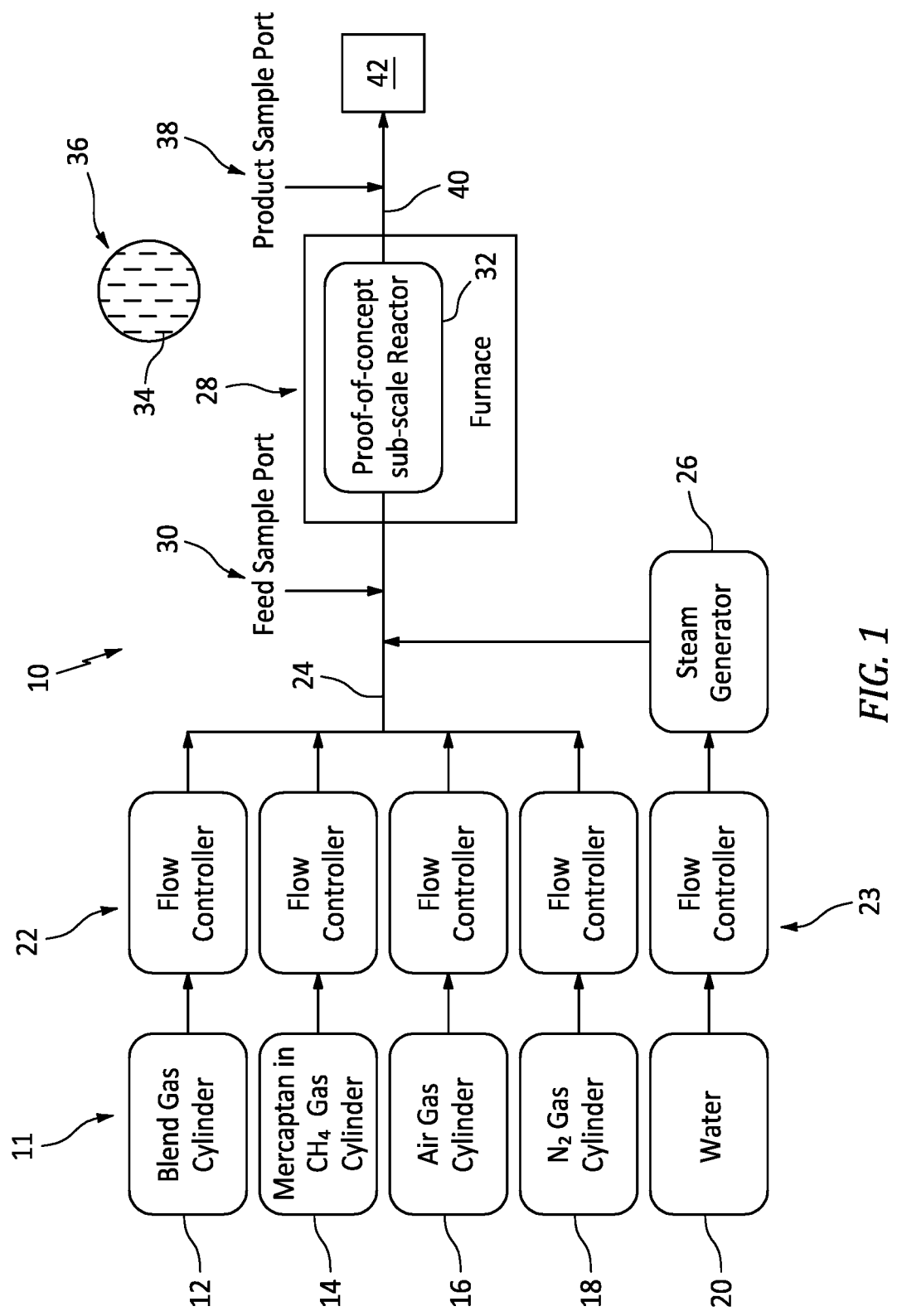
FIG. 1 is a schematic representation of a block flow diagram representing a test rig utilizing the exemplary process.

Referring now to FIG. 1, a test rig was developed to support the exemplary still gas processing and steam reforming method testing. A block flow diagram representing the test rig is shown in FIG. 1. The test rig 10 represents a typical still gas process gas 11 flow arrangement. The blend gas cylinder 12+mercaptan in CH4 cylinder 14 provide an appropriate mix stream to represent the desired feed composition to the still gas processor. Different feedstocks compositions (e.g., coker off gas, FCC off gas) can be simulated for performance evaluation. The combined dry process gas (refinery/still gas+oxidant) 11 can be represented by gas cylinders with a blend gas cylinder 12, mercaptan in $CH_4$ gas cylinder 14, air gas cylinder 16, $N_2$ gas cylinder 18 and are fluidly coupled to flow controllers 22 configured to feed into the inlet manifold 24. The water supply 20 is fluidly coupled to flow controller 23 supplying water to the steam generator 26. The steam generator 26 is fluidly coupled to the inlet manifold 24. The inlet manifold 24 supplies the conditioning stage/furnace 28. A feed sample port 30 is coupled to the inlet manifold 24 upstream of the furnace 28. The conditioning stage/furnace 28 includes a reactor 32 configured with a reforming catalyst 34 deposited on an ultra-short-channel-length metal substrate 36. A full scale processor does not need a furnace and can be lit off using a glow plug or preheated feed stream. For small scale, proof of concept testing furnace was used to preheat the catalyst for light-off. A product sample port 38 is coupled to the reactor discharge/outlet 40. A gas phase desulfurizer and steam reformer 42 can be coupled to the reactor discharge 40.

Any reforming catalyst can be employed, provided that such catalyst is capable of reforming the organic components of the fuel into a gaseous mixture comprising carbon monoxide and hydrogen. Preferably, the reforming catalyst is also capable of oxidizing the high molecular weight organosulfur compounds in the feed to low molecular weight sulfur compounds, preferably H2S. Preferably, the reforming catalyst comprises one or more noble metals selected from ruthenium, rhodium, palladium, osmium, iridium, platinum, silver, and gold, and mixtures thereof. In this invention the reforming catalyst is required to be deposited on an ultra-short-channel-length metal substrate. It is understood that any short contact time substrate made of ceramic or metal, such as the Microlith® brand substrate can be utilized. The deposition of the catalytic noble metal(s) onto the metal substrate can be implemented by various methods. Alternatively, finished catalysts comprising noble metal(s) deposited and bound to an ultra-short-channel-length metal substrate can be purchased commercially from Precision Combustion, Inc., North Haven, Connecticut. The metal substrate is preferably employed in a mesh or foam form; but the substrate is not limited to such structures, and other structures may be suitable.

In a most preferred embodiment, the reforming catalyst comprises one or more noble metals, preferably, rhodium or rhodium and one or more metals other than rhodium (PGM group metals), deposited on a Microlith® brand ultra-short-channel-length metal mesh substrate. The metal mesh is constructed from any conductive metal or combination of metals provided that the resulting structure is capable of withstanding the temperatures and chemical environment to which it is exposed. Suitable non-limiting materials of construction for the metal mesh include iron-chromium alloys, iron-chromium-aluminum alloys, and iron-chromium-nickel alloys. Such metal meshes are available commercially, for example, from Alpha Aesar and Petro Wire & Steel. The Microlith® brand substrate can be obtained commercially from Precision Combustion, Inc., noted hereinabove. A description of the technology can be found, for example, in U.S. Pat. No. 5,051,241, incorporated herein by reference. Generally, the design comprises ultra-short-channel-length, low thermal mass metal monoliths that contrast with prior art monoliths having longer channel lengths. For the purposes of this invention, the term "ultra-short-channel-length" refers to channel lengths in a range from about 25 microns (μm) (0.001 inch) to about 500 μm (0.02 inch). Thus, in visual appearance the preferred metal mesh substrate of ultra-short-channel-length looks like a reticulated net or screen. In contrast, the term "long channels" pertaining to prior art monoliths refers to channel lengths greater than about 5 mm (0.20 inch) upwards of 127 mm (5 inches). (Note that the channel length of the substrate is not to be confused with the length of the catalyst bed. The two lengths are different in kind and degree.)

As compared with prior art monolithic substrates, the preferred Microlith° brand ultra-short-channel-length metal mesh substrate facilitates packing more active surface area into a smaller volume and provides increased reactive area for a given pressure drop. Whereas in prior art honeycomb monoliths having conventional long channels, a fully developed boundary layer is present over a considerable length of the channels; in contrast, the ultra-short-channel-length characteristic of the preferred catalyst of this invention avoids boundary layer buildup. Since heat and mass transfer coefficients depend on boundary layer thickness, avoiding boundary layer buildup enhances transport properties. The advantages of employing the ultra-short-channel-length metal substrate, and preferably, the Microlith® brand thereof, to control and limit the development of a boundary layer of a fluid passing there through is described in U.S. Pat. No. 7,504,047, which is a Continuation-In-Part of U.S. Pat. No. 6,746,657 to Castaldi, both patents incorporated herein by reference.

The ultra-short-channel-length metal substrate employed in this invention can be provided in any configuration or structure, provided that the reforming process of this invention is operable. One preferred configuration comprises a coil (or coiled configuration) in which a sheet of metal mesh is rolled on itself to provide for a radial flow path from an inlet of inner diameter to an outlet of larger outer diameter. Alternatively, the catalyst can be employed as a sheet or a plurality of metal mesh layers stacked, typically, in an orderly-pile one on the other. In the stacked catalyst, the number of layers advantageously ranges from 2 to about 500 or more. The stack of layers is typically compressed to reduce or minimize void spaces between each layer. In the coiled or stack configuration, the plurality of metal mesh layers provides for a plurality of void spaces in random order. For the purposes of this invention, the term "catalyst bed" comprises the entire assembly, e.g., coil or stack, of catalytic substrate(s).

More specifically, the Microlith® brand metal mesh typically is configured with a plurality of pores having a diameter ranging from about 0.25 millimeters (mm) to about 1.0 mm, with a void space greater than about 60 percent, preferably up to about 80 percent or more. A ratio of channel length to diameter is generally less than about 2:1, preferably less than about 1:1, and more preferably, less than about 0.5:1. Preferably, the ultra-short-channel-length metal mesh has a cell density ranging from about 100 to about 1,000 cells or flow paths per square centimeter. The ultra-short-channel-length metal mesh can be constructed as disclosed, for example, in U.S. Pat. No. 6,156,444, incorporated herein by reference.

As compared with prior art monoliths, the metal mesh having the ultra-short-channel-length facilitates packing more active surface area into a smaller volume and provides increased reactive area for a given pressure drop. Whereas in prior art honeycomb monoliths having conventional long channels, a fully developed boundary layer is present over a considerable length of the channels; in contrast, the ultra-short-channel-length characteristic of the metal mesh useful for this invention avoids boundary layer buildup. Since heat and mass transfer coefficients depend on boundary layer thickness, avoiding boundary layer buildup enhances transport properties. The advantages of employing the metal mesh having the ultra-short-channel-length, and preferably, the Microlith® brand thereof, to control and limit the development of a boundary layer of a fluid passing there through is described in U.S. Pat. No. 7,504,047, which is a Continuation-In-Part of U.S. Pat. No. 6,746,657, both patents incorporated herein by reference.

In another embodiment, the one or more layers of metal mesh are replaced by a porous metal foam comprising a three-dimensional interconnected network of solid struts defining a plurality of pores of an open-cell configuration. The pores can have any shape or diameter; but typically, the number of pores that subtend one inch designate a "pore size," which for most purposes ranges from about 5 to about 40 pores per inch. The relative density of such foams, taken as the density of the foam divided by the density of solid parent material of the struts, typically ranges from about 2 to about 15 percent. Porous metal foams are commercially available in a variety of alloys capable of withstanding the operating temperatures of the fuel processing of this invention.

For the disclosed testing using the test rig 10, the blend gas cylinders, 12, 14 represent the still gas composition provided in Table 1. Cylinders 12+14 are used to simulate the desired composition. Air and water are added separately to process the still gas and reduce the amount of olefins to less than 1 vol % as well as convert organosulfur to H2S. The test rig 10 was equipped with calibrated thermal mass flow controllers 22 (Brooks Instrument) to accurately meter the simulated still gas mixture. Water flow rate was controlled using Quantim Series (Brooks Instrument) coriolis mass flow controller 23.

The water 20 was passed through the steam generator 26, consisting of ⅛" OD stainless steel tubing wrapped around a cartridge heater, prior to mixing steam with the gaseous components of the simulated still gas feed in the inlet manifold 24.

The tubular reactor 32 was placed in a Thermolyne tube furnace 28 which was used to both preheat the simulated still gas/air/steam mixture prior to reaching the catalyst 34 and maintain the catalyst 34 at the desired temperature.

During the testing, air 16 was used as the oxidant. For certain applications, pure $O_2$ or $O_2$-enriched air might be beneficial to minimize $N_2$ dilution. For steam reforming, small amount of $N_2$ was added to feed streams to act as the internal standard gas to facilitate mass balance calculations. Methyl mercaptan was used as the sulfur surrogate. Olefins were represented by ethylene while paraffins were represented by ethane. In reality, olefins and paraffins comprise a mix of C1-C5 species while sulfur is divided between mercaptan, thiophene and $H_2S$. Draeger tube sample analysis was used to monitor the $H_2S$ concentration in the reactor outlet 40.

The performance of the ultra-short-channel-length metal substrate supported monometallic Rh-based catalyst was initially tested with still gas comprising lower olefin concentration (i.e., Coker off-gas). The $H_2O/C$ ratio was maintained constant at 1. The gas hourly space velocity (GHSV) was maintained at ~150,000 $hr^{-1}$. Furnace temperature was maintained at ~750° C. and operating pressure was 1 atm. The catalyst performance was tested initially with sulfur-free still gas feed representative of Coker off-gas composition (see Table 1). The sulfur concentration was gradually increased to 100 $ppm_v$ in the feed to evaluate the effect of feed sulfur on the product distribution, namely olefin concentration in the product stream and conversion of methyl mercaptan to $H_2S$.

TABLE 1

Typical composition of refinery/still gas.

|  | FCC off-gas | Coker off-gas |
|---|---|---|
| $H_2$ vol. % | 10.8 | 26.97 |
| $CH_4$ vol. % | 37.7 | 52.8 |
| $N_2$ vol. % | 9.0 | 0.0 |
| CO vol. % | 2.15 | 2.1 |
| $CO_2$ vol. % | 2.28 | 0.03 |
| Olefins vol. % | 18.9 | 2.0 |
| Paraffins vol. % | 19.15 | 16.1 |
| Sulfur $ppm_v$ | 5-300 | 5-300 |

Table 2 shows the effect of sulfur in the feed on the catalyst selectivity at $H_2O/C$ ratio of 1, O/C ratio of 0.5 for still gas composition simulating Coker off-gas (see Table 1). In presence of sulfur, the selectivity of the reforming reactions was reduced, however the olefin concentration in the product stream was still less than 1 vol. % (dry). Further, complete conversion of methyl mercaptan to H2S was observed. Reduction of olefin concentration and conversion of native organic sulfur to H2S were the primary objectives of the still gas processing catalyst. The reduced hydrocarbon conversion does not affect the overall system efficiency as the downstream steam reformer can easily accept high concentrations of CH4 in the feed without sacrificing durability.

TABLE 2

Product distribution (vol. %, dry basis) observed during processing of Coker off-gas with and without sulfur on ultra-short-channel-length metal substrate supported Rh-based catalyst. The $H_2O/C$ ratio and O/C ratio were 1 and 0.5, respectively. GHSV was ~150,000 $hr^{-1}$.

| Still Gas Processor Product Distribution | Equilibrium (no sulfur) | Coker off-gas (no sulfur) | Coker off-gas (100 $ppm_v$ sulfur) |
|---|---|---|---|
| $H_2$ vol. % (dry) | 51.9 | 46.6 | 24.9 |
| $CH_4$ vol. % (dry) | 5.2 | 12.3 | 23.8 |
| $N_2$ vol. % (dry) | 23.3 | 23.8 | 37.3 |
| CO vol. % (dry) | 13.9 | 10.4 | 8.4 |
| $CO_2$ vol. % (dry) | 5.7 | 6.8 | 3.1 |
| Ethylene vol. % (dry) | Trace | 0.001 | 0.7 |
| Ethane vol. % (dry) | Trace | 0.07 | 1.8 |

The effect of higher sulfur concentration on still gas (representing Coker off-gas) processing on an ultra-short-channel-length metal substrate supported Rh-based catalyst was also studied at $H_2O/C$ ratio of 1, O/C ratio of 0.75 and GHSV of ~175,000 $hr^{-1}$.

Data reported in Table 3 shows that ultra-short-channel-length metal substrate supported Rh-based catalyst was able to reduce the olefin concentration to less than 1 vol. % (dry) from ~2 vol. % (dry) in the feed still gas at O/C ratio of 0.75, $H_2O/C$ ratio of 1 and GHSV of ~175,000 $hr^{-1}$ when processing Coker off-gas comprising up to 300 $ppm_v$ sulfur. Increase in the O/C ratio from 0.5 to 0.75 resulted in an increase in the $CH_4$ conversion and reduction in product olefin concentration. The product distribution was nearly independent of the sulfur level in the feed with marginal increase in the product olefin concentration with increase in the feed sulfur level. At all conditions, complete conversion of methyl mercaptan to $H_2S$ was observed.

TABLE 3

Product distribution (vol. %, dry basis) observed during processing of Coker off-gas in presence of sulfur (in form of methyl mercaptan) up to 300 $ppm_v$ on ultra-short-channel-length metal substrate supported Rh-based catalyst. The $H_2O/C$ ratio and O/C ratio were 1 and 0.75, respectively. GHSV was ~175,000 $hr^{-1}$.

| Still Gas Processor Product Distribution | Coker off-gas (100 $ppm_v$ sulfur) | Coker off-gas (200 $ppm_v$ sulfur) | Coker off-gas (300 $ppm_v$ sulfur) |
|---|---|---|---|
| $H_2$ vol. % (dry) | 25.2 | 23.9 | 23.4 |
| $CH_4$ vol. % (dry) | 16.9 | 17.3 | 17.3 |
| $N_2$ vol. % (dry) | 43.2 | 44.0 | 44.4 |
| CO vol. % (dry) | 9.5 | 9.3 | 9.3 |
| $CO_2$ vol. % (dry) | 3.8 | 3.8 | 3.8 |
| Ethylene vol. % (dry) | 0.4 | 0.5 | 0.6 |
| Ethane vol. % (dry) | 1.0 | 1.1 | 1.1 |

Table 4 through Table 7 are provided to demonstrate the feasibility of MICROLITH brand ultra-short-channel-length metal substrate comprising supported Rh-based catalyst to directly process refinery/still gas (without any dilution) comprising up to ~19 vol. % (dry) olefins and up to 300 $ppm_v$ sulfur at GHSV up to 175,000 $hr^{-1}$ in presence of steam and oxygen. Complete conversion of organic sulfur in feed to $H_2S$ was observed while reducing the olefin concentration in the processed stream to less than 1 vol. % (dry).

TABLE 4

Product distribution (vol. %, dry basis) observed during processing of FCC off-gas with and without sulfur on ultra-short-channel-length metal substrate supported Rh-based catalyst. The $H_2O/C$ ratio and O/C ratio were 2 and 0.5, respectively. GHSV was ~145,000 $hr^{-1}$.

| Still Gas Processor Product Distribution | Equilibrium (no sulfur) | FCC off-gas (no sulfur) | FCC off-gas (100 $ppm_v$ sulfur) |
|---|---|---|---|
| $H_2$ vol. % (dry) | 53.1 | 49.7 | 29.7 |
| $CH_4$ vol. % (dry) | 0.95 | 4.8 | 12.5 |
| $N_2$ vol. % (dry) | 23.6 | 23.7 | 35.7 |
| CO vol. % (dry) | 12.4 | 10.1 | 14.5 |
| $CO_2$ vol. % (dry) | 9.9 | 11.5 | 5.3 |
| Ethylene vol. % (dry) | Trace | 0.006 | 0.7 |
| Ethane vol. % (dry) | Trace | 0.17 | 1.6 |

TABLE 5

Product distribution (vol. %, dry basis) observed during processing of FCC off-gas in presence of sulfur (in form of methyl mercaptan) up to 300 ppm$_v$ on ultra-short-channel-length metal substrate supported Rh-based catalyst. The H$_2$O/C ratio and O/C ratio were 2 and 0.75, respectively. GHSV was ~165,000 hr$^{-1}$.

| Still Gas Processor Product Distribution | FCC off-gas (100 ppm$_v$ sulfur) | FCC off-gas (200 ppm$_v$ sulfur) | FCC off-gas (300 ppm$_v$ sulfur) |
|---|---|---|---|
| H$_2$ vol. % (dry) | 27.7 | 25.4 | 24.5 |
| CH$_4$ vol. % (dry) | 9.7 | 10.1 | 10.3 |
| N$_2$ vol. % (dry) | 42.3 | 43.7 | 44.7 |
| CO vol. % (dry) | 12.9 | 13.2 | 13.2 |
| CO$_2$ vol. % (dry) | 6.1 | 5.9 | 5.6 |
| Ethylene vol. % (dry) | 0.4 | 0.6 | 0.7 |
| Ethane vol. % (dry) | 0.9 | 1.0 | 1.1 |

TABLE 6

Product distribution (vol. %, dry basis) observed during processing of FCC off-gas containing 300 ppm$_v$ sulfur (in form of methyl mercaptan) on ultra-short-channel-length metal supported Rh-based catalyst. The H$_2$O/C ratio was varied from 1-2 at constant O/C ratio of 0.75

| Still Gas Processor Product Distribution | FCC off-gas (300 ppm$_v$ sulfur) H$_2$O/C = 2 | FCC off-gas (300 ppm$_v$ sulfur) H$_2$O/C = 1.5 | FCC off-gas (300 ppm$_v$ sulfur) H$_2$O/C = 1 |
|---|---|---|---|
| H$_2$ vol. % (dry) | 24.5 | 25.1 | 25.5 |
| CH$_4$ vol. % (dry) | 10.3 | 10.1 | 10.1 |
| N$_2$ vol. % (dry) | 44.7 | 44.0 | 43.5 |
| CO vol. % (dry) | 13.2 | 13.6 | 14.3 |
| CO$_2$ vol. % (dry) | 5.6 | 5.5 | 5.2 |
| Ethylene vol. % (dry) | 0.7 | 0.6 | 0.6 |
| Ethane vol. % (dry) | 1.1 | 1.0 | 1.0 |

TABLE 7

Product distribution (vol. %, dry basis) observed during processing of FCC off-gas containing 300 ppm$_v$ sulfur (in form of methyl mercaptan) on ultra-short-channel-length metal supported supported Rh-based catalyst. The O/C ratio and H$_2$O/C ratios were held constant at 0.75 and 2, respectively. The operating pressure was varied from 0 to 100 psig.

| Still Gas Processor Product Distribution | FCC off-gas (300 ppm$_v$ sulfur) p = 0 psig | FCC off-gas (300 ppm$_v$ sulfur) P = 100 psig |
|---|---|---|
| H$_2$ vol. % (dry) | 24.5 | 32.0 |
| CH$_4$ vol. % (dry) | 10.3 | 10.0 |
| N$_2$ vol. % (dry) | 44.7 | 38.1 |
| CO vol. % (dry) | 13.2 | 10.5 |
| CO$_2$ vol. % (dry) | 5.6 | 8.9 |
| Ethylene vol. % (dry) | 0.7 | 0.2 |
| Ethane vol. % (dry) | 1.1 | 0.3 |

Figure 2:
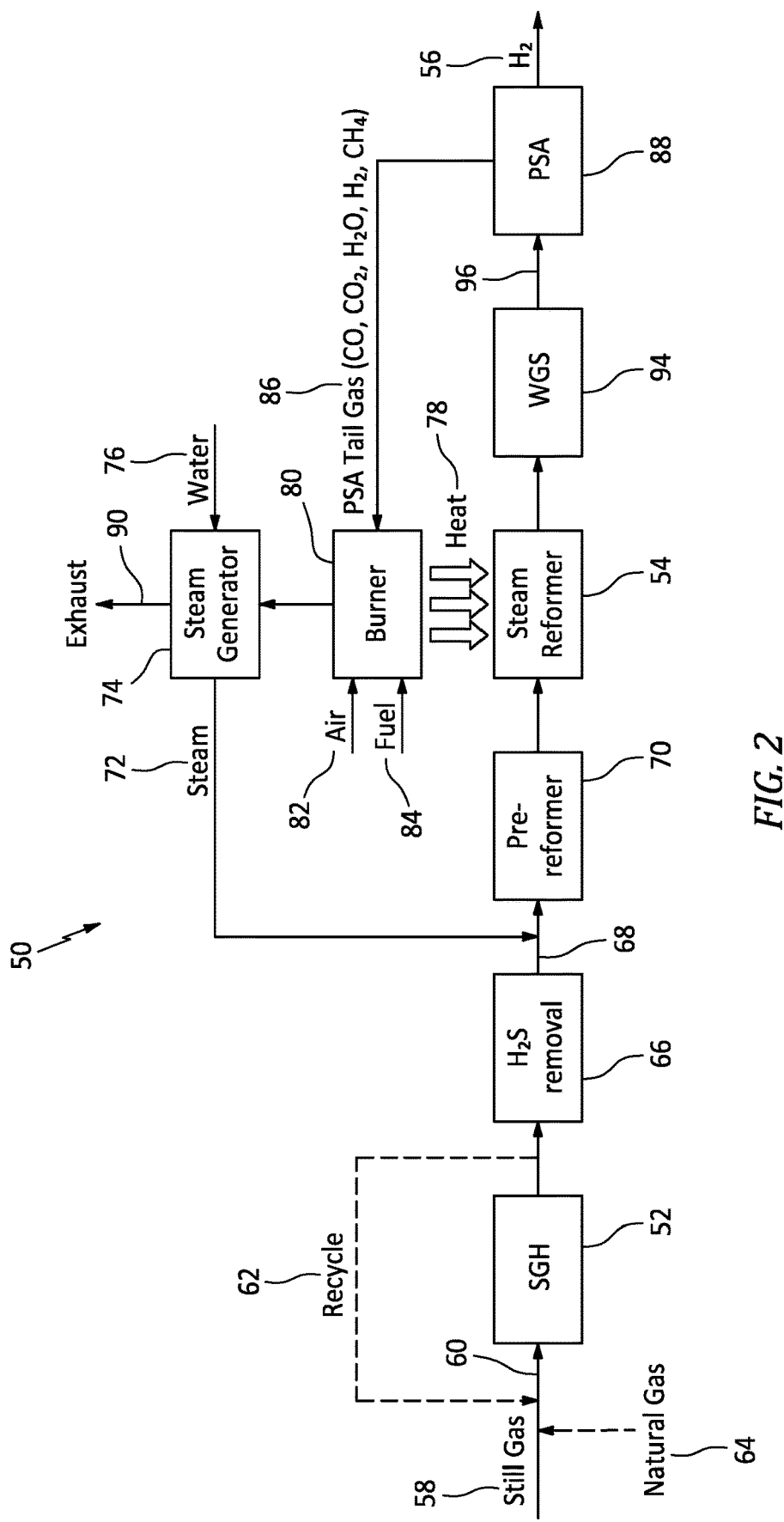
FIG. 2 is a schematic of a traditional process flow diagram configuration comprising Still Gas Hydrotreater (SGH) and Steam Reformer for 52 production from still gas.

Referring also to FIG. 2, an exemplary still gas hydrotreater (SGH) 50 is shown as a configuration comprising Still Gas Hydrotreater (SGH) 52 and steam reformer 54 for H$_2$ 56 production from still gas 58. All heat-exchange processes are not shown for simplification. The exemplary still gas hydrotreater includes the purpose of Olefin hydrogenation and conversion of organic sulfur (e.g., mercaptans) to H$_2$S. The still gas hydrotreater includes a narrow operating temperature range (275-400° C.) The still gas hydrotreater includes hydrotreating catalysts (nickel or cobalt molybdenum) that must be sulfided to be fully active. Pre-sulfiding is often done to enhance activity as in hydrodesulfurization or control hyperactivity as with fresh or regenerated catalyst used for hydrocracking. Under certain operating conditions, such as hydrodealkylation, pre-sulfiding selectively poisons the active sites that may degrade benzene. Certain catalysts suffer from deactivation due to occasional lower feed sulfur content, which leads to a loss of catalyst surface sulfur resulting in catalyst reduction. Catalysts suffer from deactivation due to exothermicity associated with hydrogenation of high olefin concentrations. The still gas hydrotreater 52 can process a maximum acceptable olefin concentration of ~5% in the feed gas 60. The still gas hydrotreater 52 can include a recycle loop 62 and/or natural gas (NG) 64 dilution with a cooler (not shown) needed to process higher than 5% olefins in the feed gas 60, thus reduced processing capability.

The still gas hydrotreater 52 discharges to a hydrogen sulfide (H$_2$S) removal unit 66. The discharge 68 from the H$_2$S removal unit 66 is fed downstream to a pre-reformer 70. Steam 72 can be mixed with the discharge 68 upstream of the pre-reformer 70. The steam 72 can be produced at a steam generator 74 having a water supply 76. The feed 68 is fed to the steam reformer 54. The steam reformer 54 receives thermal energy 78 from feed heater or simply burner 80.

Burner 80 receives air 82 and fuel 84 as well as PSA tail gas 86. The pressure swing adsorption (PSA) 88 unit can provide the PSA tail gas 86 comprising CO, CO$_2$, H$_2$O, unconverted CH$_4$, and leftover H$_2$ as combustion fuel to the burner 80. The Burner 80 discharges exhaust 90 to the steam generator 74 as a source of thermal energy.

The steam reformer 54 discharges a reformate stream 92 to be supplied to a water gas shift (WGS) unit 94. The reformate stream 96 exiting the water gas shift unit 94 is fed to the PSA unit 88 which discharges the H$_2$ 56.

Figure 3:
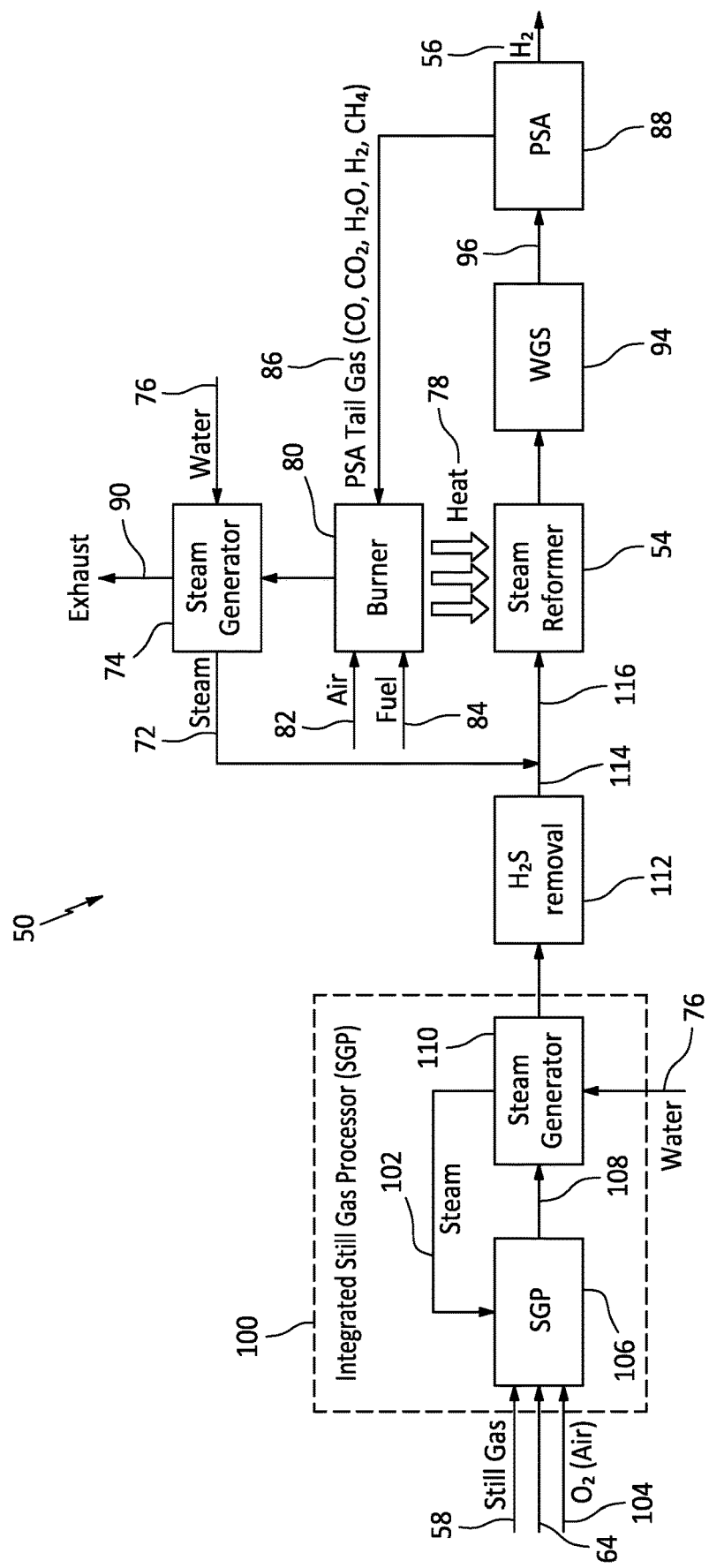
FIG. 3 is a schematic of an exemplary system configuration with an ultra-short-channel-length substrate Still Gas Processor (SGP) and Steam Reformer for $H_2$ production from still gas.

Referring also to FIG. 3, an exemplary integrated still gas processor (SGP) 100 and steam reformer 54 for H$_2$ 56 production from still gas 58 is shown. FIG. 3 includes a highly simplified schematic of a possible system configuration comprising still gas processor (SGP) 100 and steam reformer 54 for H$_2$ 56 production from still gas 58. It should be noted that not all heat exchange processes are shown for simplicity. This process schematic represents an exemplary system as one possible configuration of system integration for H$_2$ recovery from refinery/still gas 58.

In the exemplary FIG. 3 system configuration, the refinery/still gas stream 58 is compressed to the desired pressure. No upstream desulfurization is necessary. However, removal of chlorine and/or particulates, if any, is required. Pressurized still gas 58 is then mixed with compressed natural gas 64, if needed to reduce the heat duty on the downstream steam reformer. However, no dilution is necessary. The mix stream of still gas 58 and natural gas 64 is combined with steam 102 and oxidant 104. Pure oxygen is preferred to avoid dilution of the product stream and improve H$_2$ selectivity. The mixed stream of still gas 58, natural gas 64 (if added), steam 102 and O$_2$ 104 is then preheated to <600° C. and then fed to the still gas processor (SGP) 106. The O/C ratio is maintained between ~0.25-0.75 while the H$_2$O/C ratio is maintained between ~0.5-1.0 depending on the feed composition. The temperature of the still gas processor 106 is typically less than 1000° C. at up to ~300 psia operating pressure. The still gas processor 106 operating conditions are down selected so as to reduce the olefin concentration to less than 1 vol. % (dry) and convert all the native organic sulfur to H$_2$S. The outlet gas stream 108 from the still gas processor 106 is heat exchanged in a steam generator 110 with water 76 to generate steam 102 for the still gas processor 106. The cooled outlet gas stream from the still gas processor 106, post the heat exchanger 110, is fed to a ZnO desulfurizer 112 to scrub the H$_2$S to less than 0.1 ppm$_v$.

This partially reformed stream 114(i.e., SGP outlet), devoid of sulfur, is next mixed with additional steam 72 and introduced as feed to the steam methane reformer 54 feed heater section. The steam reformer feed 116 temperature is raised to ~700° C. in this feed heater. The heated feed stream is next fed to the steam reformer catalytic section. The heat duty required for the endothermic steam reforming reactions as well as the steam reformer feed heater is provided by combustion of natural gas 84 and air 82 in the combustion chamber of the reformer burner 80. A typical steam reformer 54 operating temperature is ~800° C. at 200 psia operating pressure. Air is preheated before entering the combustion section. Tail gas 86 from PSA is also utilized as a combustion fuel. The combustion products are used to heat the reformer feed 116, superheat reformer steam 72 and to heat the combustion air 82. The cooled combustion products are vented out after being treated in a selective catalytic sulfur removal (SCSR) unit.

The reformate stream 96 produced by the steam reformer 54 is heat exchanged to generate steam 72 and then fed to an adiabatic water gas shift (WGS) unit 94, with an inlet temperature of ~350° C. to increase the partial pressure of $H_2$ 56. The reformate stream 96 exiting the WGS unit 94 is further cooled before being fed to a PSA unit 88 where $H_2$ 56 was recovered. $H_2$ recovery rate depends on the partial pressure of $H_2$ in the reformate stream 96 and system operation conditions. The PSA tail gas 86 comprising CO, $CO_2$, $H_2O$, unconverted $CH_4$, and leftover $H_2$ was supplied as combustion fuel to the steam reformer 54.

The disclosed process includes the technical advantage that allows for maintaining a controlled feed to the steam reformer as well as relatively constant operating conditions within the fired steam reformer which is otherwise deactivated due to presence of high concentration of olefins and sulfur in feed. No additional pre-reformer is needed and the method allows flexibility in feedstock composition. No recycle loops are needed (avoids high temperature recycle compressors, minimize complexity and cost). No natural gas dilution of feedstock is necessary to improve single pass utilization.

In some cases, a pre-reformer could be utilized upstream of the steam reformer for adiabatic steam-hydrocarbon reforming when hydrocarbons with carbon atoms of 2 and over are present. However, since the still gas processor is operated in an oxidative mode, it also performs the pre-reformer functionality and a separate unit is not necessary.

The disclosed process includes the technical advantage that allows for direct processing of still gas comprising up to ~19 vol. % olefins in oxidative mode without any dilution or recycle, thus increasing single-pass processing capability. In comparison, traditional hydrotreating catalysts are limited to maximum olefin concentration of ~5 vol. % in still gas without any recycle or feedstock dilution with natural gas.

The disclosed process includes the technical advantage that allows for selective reduction of olefins in the still gas to less than 1.0 vol. % (dry) in the intermediate product stream. O/C ratio was varied between 0.5-0.75 at steam-to-carbon ratio ($H_2O$/C) of 1 to provide a controlled feed to the downstream steam reformer. O/C ratio as low as 0.25 is feasible. The processed still gas stream devoid of $H_2S$ was deemed as acceptable feed to traditional Ni-based steam reformer.

The disclosed process includes the technical advantage that allows for complete conversion of organic sulfur (up to 300 ppm$_v$) present in the still gas to $H_2S$. No upstream sulfur cleanup or guard bed is necessary. $H_2S$ can be readily removed in a downstream ZnO desulfurizer before feeding the steam reformer.

The disclosed process includes the technical advantage that allows for still gas processing at high space velocities up to 175,000 hr$^{-1}$ without compromising the olefin or sulfur conversion efficiency. In comparison, traditional hydrotreaters operate at space velocity of up to ~4,000 hr$^{-1}$. Thus, the disclosed still gas processor can be smaller and less expensive than conventional hydrotreaters.

The disclosed process includes the technical advantage that allows for the ultra-short-channel-length metal substrate supported catalysts to operate without a need to be sulfided. No deactivation is observed for ultra-short-channel-length metal substrate catalysts due to low sulfur containing feed (unlike traditional Ni— or Co— based hydrotreating catalysts).

The disclosed process includes the technical advantage that allows for the ultra-short-channel-length metal substrate supported catalysts to a have wider temperature window of operation (up to 1000° C.) unlike traditional Ni— or Co— based hydrotreating catalysts that get deactivated above ~400° C.

There has been provided a refinery gas process. While the refinery gas process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A refinery gas system for hydrogen recovery comprising:
   a conditioning stage fluidly coupled to an inlet manifold, said conditioning stage comprising a reactor having a reforming catalyst deposited on an ultra-short-channel-length substrate;
   an oxidant stream fluidly coupled to said conditioning stage via said inlet manifold upstream of said conditioning stage;
   a steam generator fluidly coupled to said conditioning stage via said inlet manifold upstream of said conditioning stage;
   at least one process gas supply fluidly coupled upstream of said conditioning stage via said inlet manifold; and
   a discharge outlet fluidly coupled to said conditioning stage, the discharge outlet configured to flow a product for gas phase desulfurization and subsequently for use by a downstream reformer.

2. The refinery gas system for hydrogen recovery according to claim 1, wherein said reforming catalyst comprising an Rh-based catalyst.

3. The refinery gas system for hydrogen recovery according to claim 1, wherein said conditioning stage is configured for the refinery gas processing at space velocities as high as 175,000 hr$^{-1}$.

4. The refinery gas system for hydrogen recovery according to claim 1, wherein said conditioning stage is configured for processing refinery gas comprising up to about 19 volume percent olefins in an oxidative mode in the absence of a dilution or a recycle.

5. The refinery gas system for hydrogen recovery according to claim 1, wherein said feed gas comprises a still gas composition.

6. The refinery gas system for hydrogen recovery according to claim 1, wherein said reforming catalyst deposited on the ultra-short-channel-length metal substrate configured to operate up to 1000 degrees Centigrade.

7. The refinery gas system for hydrogen recovery according to claim 1, wherein non-sulfided reforming catalyst is deposited on the ultra-short-channel-length metal substrate.

8. The refinery gas system for hydrogen recovery according to claim 1, wherein said reforming catalyst deposited on the ultra-short-channel-length metal substrate that is configured to perform a complete conversion of an organic sulfur species present in the refinery gas.

9. A process for hydrogen recovery from refinery gas system comprising:
supplying the refinery gas to an inlet manifold fluidly coupled to a conditioning stage, said conditioning stage comprising a reactor having a reforming catalyst deposited on an ultra-short-channel-length metal substrate;
supplying oxidant to said conditioning stage via said inlet manifold;
supplying steam from a steam generator to said conditioning stage via said inlet manifold;
reacting said refinery gas in said conditioning stage; and
discharging a product through a discharge outlet fluidly coupled to said conditioning stage, the discharge outlet configured to flow the product to a downstream gas phase desulfurizer followed by for use by a downstream reformer.

10. The process of claim 9, further comprising:
processing at space velocities as high as 175,000 hr$^{-1}$ through said conditioning stage.

11. The process of claim 9, further comprising:
processing of feed gas comprising up to about 19 volume percent olefins in an oxidative mode in the absence of a dilution or a recycle through said conditioning stage.

12. The process of claim 9, further comprising:
performing a complete conversion of an organic sulfur present in the refinery gas feed on said reforming catalyst deposited on the ultra-short-channel-length metal substrate.

13. The process of claim 9, further comprising:
reacting said refinery gas in said conditioning stage up to 1000 degrees Centigrade.

14. The process of claim 9, further comprising:
performing selective reduction of olefins in the refinery gas to less than 1.0 volume percent in the product.

15. The process of claim 9, wherein said reforming catalyst comprises an Rh-based catalyst.

16. The process of claim 9, supplying oxidant to the conditioning stage via the inlet manifold includes an O/C ratio of 0.25-0.75. The quantity of oxidant relative to quantity of refinery/still gas fed to the conditioning stage is best described by an O/C ratio, wherein "O" represents the moles of oxygen present in the oxidant and "C" represents the moles of carbon present in the refinery/still gas fed to the conditioning stage.

17. The process of claim 9, wherein supplying steam from a steam generator to said conditioning stage via said inlet manifold includes a steam-to-carbon ratio of 0.5-1.0.

18. The process of claim 9, further comprising:
operating at pressure compatible with the downstream steam reformer of up to 300 psia.

* * * * *